(12) United States Patent
Bakker et al.

(10) Patent No.: US 9,262,830 B2
(45) Date of Patent: Feb. 16, 2016

(54) 2D/3D IMAGE REGISTRATION

(75) Inventors: Nicolaas Hylke Bakker, Eindhoven (NL); Sandar Hans Denissen, Veldhoven (NL); Wilhelmus Henrica Gerarda Maria Van Den Boomen, Valkenswaard (NL); Daniel Simon Anna Ruijters, Eindhoven (NL); Pieter Maria Mielekamp, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 185 days.

(21) Appl. No.: 14/002,375

(22) PCT Filed: Feb. 27, 2012

(86) PCT No.: PCT/IB2012/050898
§ 371 (c)(1),
(2), (4) Date: Aug. 30, 2013

(87) PCT Pub. No.: WO2012/120405
PCT Pub. Date: Sep. 13, 2012

(65) Prior Publication Data
US 2013/0336565 A1    Dec. 19, 2013

(30) Foreign Application Priority Data
Mar. 4, 2011   (EP) .................................. 11305232

(51) Int. Cl.
*G06T 7/00* (2006.01)
(52) U.S. Cl.
CPC ............. *G06T 7/0024* (2013.01); *G06T 7/0028* (2013.01); *G06T 2207/10121* (2013.01); *G06T 2207/20092* (2013.01); *G06T 2207/20212* (2013.01); *G06T 2207/30101* (2013.01); *G06T 2211/404* (2013.01)

(58) Field of Classification Search
None
See application file for complete search history.

(56) References Cited

U.S. PATENT DOCUMENTS

| 7,831,073 | B2 * | 11/2010 | Fu et al. ....................... 382/128 |
| 2003/0181809 | A1 * | 9/2003 | Hall et al. ..................... 600/425 |
| 2005/0027193 | A1 * | 2/2005 | Mitschke et al. ............. 600/427 |

(Continued)

FOREIGN PATENT DOCUMENTS

| DE | 10210647 A1 | 10/2003 |
| DE | 102005035430 A1 | 2/2007 |
| WO | WO2008120136 A1 | 10/2008 |

OTHER PUBLICATIONS

Deguchi et al. "Camera motion tracking of real bronchoscope using epipolar geometry analysis and CT derived bronchoscopic images," 2002.*

(Continued)

*Primary Examiner* — Vu Le
*Assistant Examiner* — Alexander J Lesnick

(57) ABSTRACT

2D images are registered with 3D volume data. In order to provide 2D/3D registration with a facilitated workflow 3D volume data (112) of an object, having a frame of reference is received. A transformation plane (116) is defined in relation to the 3D volume data. A 2D image of the object with an image plane is received. The transformation plane is projected on the image plane. The frame of reference is aligned with the 2D image. At least one alignment interaction value (128) is projected (130) on the transformation plane to determine (134) at least one transformed interaction value (132). The frame of reference is translated with the at least one transformed interaction value.

10 Claims, 9 Drawing Sheets

(56) References Cited

U.S. PATENT DOCUMENTS

| | | |
|---|---|---|
| 2005/0047544 A1* | 3/2005 | Fu et al. .......................... 378/63 |
| 2006/0002630 A1* | 1/2006 | Fu et al. ........................ 382/294 |
| 2006/0159318 A1 | 7/2006 | Alyassin |
| 2006/0269108 A1 | 11/2006 | Viswanathan |
| 2008/0130825 A1* | 6/2008 | Fu et al. ............................ 378/8 |
| 2008/0234570 A1* | 9/2008 | Gerard et al. ................. 600/424 |
| 2008/0275666 A1* | 11/2008 | Ohta et al. .................... 702/152 |
| 2009/0005668 A1* | 1/2009 | West et al. .................... 600/407 |
| 2010/0066732 A1* | 3/2010 | Kopf et al. .................... 345/419 |
| 2010/0266220 A1* | 10/2010 | Zagorchev et al. ........... 382/285 |
| 2011/0038517 A1* | 2/2011 | Mistretta et al. .............. 382/128 |
| 2011/0206248 A1* | 8/2011 | Ruijters ........................ 382/128 |

OTHER PUBLICATIONS

Ector J et al: "Biplane Three-Dimensional Augmented Fluoroscopy as Single Navigation Tool for Ablation of Atrial Fibrillation: Accuracy and Clinical Value", Heart Rhythm, Elsevier, US, vol. 5, No. 7, Jul. 1, 2008, pp. 957-964, XP022819444,.

Haque Nazmul et al., "A Computationally Efficient Approach for 2D-3D Image Registration", 32nd Annual International Conference of the IEEE EMBS Buenos Aires, Argentina, Aug. 31-Sep. 4, 2010, pp. 6268-6271.

\* cited by examiner

2D/3D IMAGE REGISTRATION

CROSS-REFERENCE TO PRIOR APPLICATIONS

This application is the U.S. National Phase application under 35 U.S.C. §371 of International Application Serial No. PCT/IB2012/050898, filed on Feb. 27, 2012, which claims the benefit of European Application Serial No. 11305232.8, filed on Mar. 4, 2011. These applications are hereby incorporated by reference herein.

FIELD OF THE INVENTION

The present invention relates to the registration of 2D images with 3D volume data. The present invention relates in particular to an imaging device for registering 2D images with 3D volume data, an imaging system for registering 2D and 3D image data, a method for registering 2D images with 3D volume data, as well as a computer program element and a computer readable medium.

BACKGROUND OF THE INVENTION

A combination of a 2D image with three-dimensional volume data is helpful, for example, during medical examination and intervention procedures. As an example, a combination of 2D and 3D data, wherein the two are registered to each other, allows the combination of a live image in form of the 2D image, added by additional visual information in form of the 3D image data. The registration of the 2D image to the 3D image data is necessary in order to allow a visual combination. Registration can be provided, for example, by two 2D images taken at different projections. These can then be used for a manual registration in an iterative multi-step procedure. WO 2008/120136 A1 describes a machine-based registration of a 3D volume data and a 2D image data. As a further possibility, a peri-interventional 3D scan, i.e. peri-interventional three-dimensional image data, can be acquired for the image-based registration. However, it has been shown that registration modes are either cumbersome, and time-consuming for the user, or have a limited range of use due to technical restrictions.

SUMMARY OF THE INVENTION

It is an object of the present invention to provide 2D/3D registration with a facilitated workflow for the user.

The object of the present invention is solved by the subject-matter of the independent claims, wherein further embodiments are incorporated in the dependent claims.

It should be noted that the following described aspects of the invention apply also for the method, the imaging device, the imaging system, the computer program element and the computer readable medium.

According to an aspect of the invention, a method for registering 2D images with 3D volume data is provided, comprising the following steps:

a) providing 3D volume data of an object, comprising a frame of reference;

b) defining at least one transformation direction in relation to the 3D volume data;

c) providing a 2D image of the object with an image plane; and projecting the at least one transformation direction on the image plane;

d) aligning the frame of reference with the 2D image; wherein at least one alignment interaction value is projected on the at least one transformation direction to determine at least one transformed interaction value; and e) translating the frame of reference with the at least one transformed interaction value.

According to an exemplary embodiment, step b) comprises a definition of a second projection direction, which, together with the first projection direction, is forming a transformation plane in relation to the 3D volume data. Step c) comprises a projection of the transformation plane on the image plane. Step d) comprises a projection of the at least one alignment interaction value on the transformation plane.

According to an exemplary embodiment, step a) comprises providing a first 2D image of the object with a first image plane in a first viewing direction; and blending the 2D image with a visualization of the 3D volume data. Before step b), a step i) is provided, comprising aligning the frame of reference with the first 2D image. Step b) comprises defining the transformation plane perpendicular to the first image plane. Step c) comprises providing a second 2D image of the object with a second image plane in a second viewing direction, and projecting the transformation plane on the second 2D image. Step d) comprises aligning the frame of reference with the second 2D image for determining the at least one transformed interaction value.

According to a further exemplary embodiment, in step i), the frame of reference is aligned by a spatial translation of the volume data within the first image plane. Further, in step d) the frame of reference is aligned by a spatial translation of the volume data within the second image plane. Still further, in step e) the frame of reference is translated within the transformation plane.

According to an exemplary embodiment, the 3D volume data is provided in a first projection corresponding to the first viewing direction in step a). In step d) the volume data is provided in a second projection corresponding to the second viewing direction.

According to a further aspect, an imaging device for registering 2D images with 3D volume data is provided, comprising a processing unit, a display unit, and an alignment unit. The processing unit is adapted to provide 3D volume data, comprising a frame of reference. The processing unit is also adapted to define at least one transformation direction in relation to the image plane. Further, the processing unit is adapted to provide a 2D image with an image plane and to project the at least one transformation direction on the image plane. Further, the processing unit is adapted to project at least one alignment interaction value on the at least one transformation direction to determine at least one transformed interaction value, and to translate the frame of reference with the at least one transformed interaction value. The alignment unit is adapted to align the frame of reference with the first 2D image, and to align the frame of reference with the second 2D image.

According to an exemplary embodiment, the processing unit is adapted to provide a first 2D image with a first image plane, and to blend the 2D image with a visualization of the 3D volume data. The processing unit can also be also adapted to define a second projection direction, which, together with the first projection direction, is forming a transformation plane (116) in relation to the 3D volume data, for example perpendicular to the first image plane. Further, the processing unit is adapted to provide a second 2D image with a second image plane and to project the transformation plane on a second 2D image with a second image plane. Further, the processing unit is adapted to project at least one alignment interaction value on the transformation plane to determine the at least one transformed interaction value.

The 2D images may be X-ray fluoroscopy images. The 3D volume data can be provided as CT volume data.

It is noted that the image data can be acquired with or without contrast agent, depending on the structure or elements used for registration.

According to a further example, the CT volume data may be segmented volume data.

According to a further example, not shown, the 2D images can also be provided as ultrasound images.

According to a further aspect of the invention, an imaging system for registering 2D and 3D image data is provided, comprising an image acquisition arrangement and an imaging device according to the above-mentioned aspect. The image acquisition arrangement is adapted to acquire the data for the first 2D image and the second 2D image.

For example, the image acquisition arrangement is also adapted to acquire the 3D volume data.

It can be seen as the gist of the invention to provide a way of interaction in which moving the frame of reference in one image will result in minimal and predictable changes in the other image. According to the present invention, the user can register a 2D and 3D image frame of reference in 2D images without the need to iteratively correct either views. For example, when manipulating the frame of reference of the 3D data in the manipulating view, the movements in the other view are as minimal and predictable as possible. When manipulating the other view, the movements in the first view are minimized. This is achieved in one example by only allowing movements in the manipulating view that correspond to the up and down direction and forward and backward direction of the other reference. This is achieved by projecting the alignment interaction on a transformation plane which is perpendicular to the 2D image plane of the other image. Then, the frame of reference of the 3D data is translated with the transformed interaction value instead of using the alignment interaction directly.

These and other aspects of the present invention will become apparent from and elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
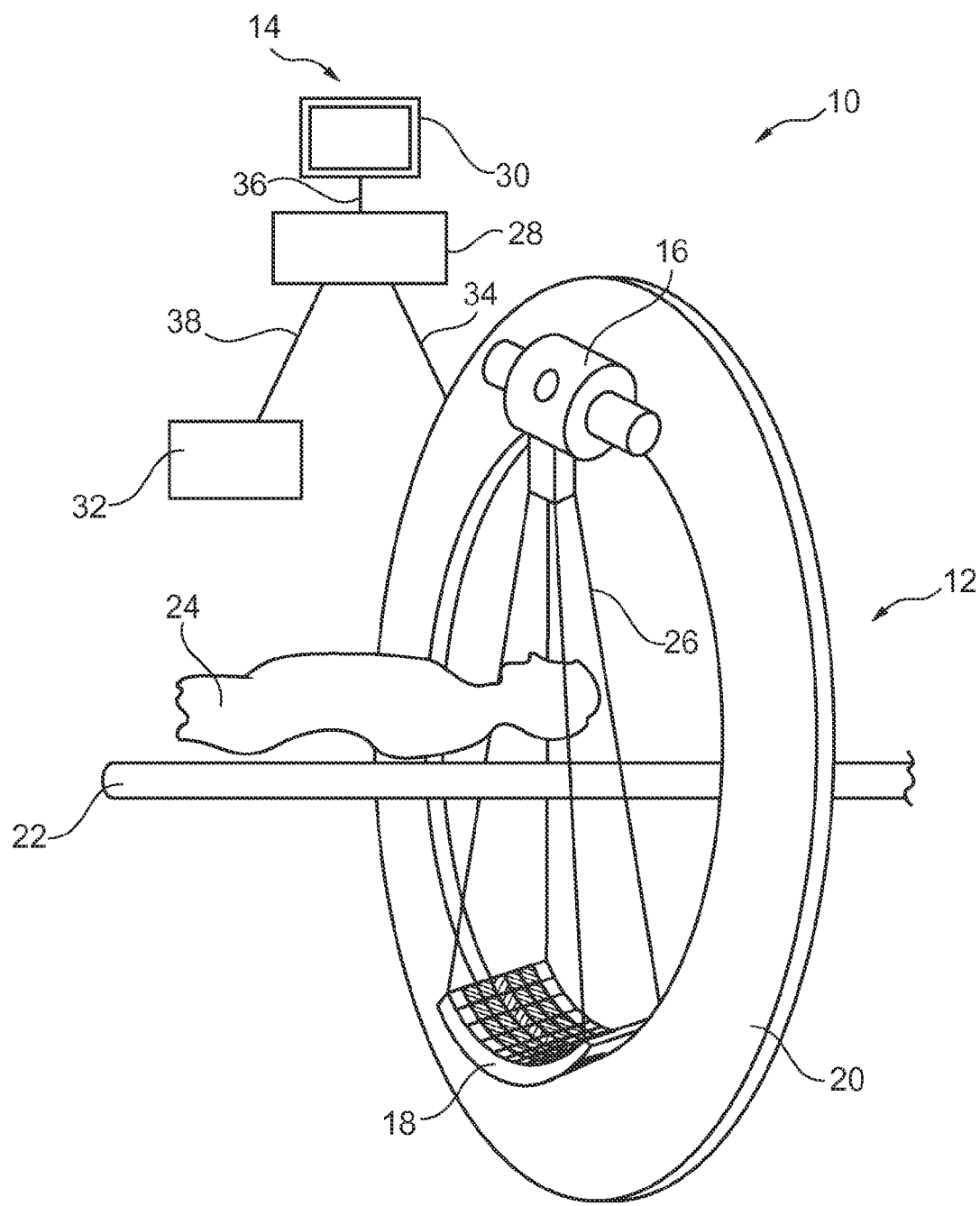
FIG. 1 illustrates an imaging system for registering 2D and 3D image data according to an exemplary embodiment of the invention.

FIG. 1 shows an imaging system 10 for registering 2D and 3D image data. An image acquisition arrangement 12 and an imaging device 14 for registering 2D images with 3D volume data are provided. The latter will also be described with reference to FIG. 2.

The image acquisition arrangement 12 is provided with an X-ray source 16 and a detector 18. Further, a gantry 20 is provided. Still further, a table 22 is provided to receive an object of interest, for example a patient 24.

The X-ray source 16 generates an X-ray beam 26 such that the X-ray beam 26 is radiated in the direction of the detector 18.

The X-ray source 16 and the detector 18 are provided on opposite sides of the gantry structure 20. The object, for example the patient 24, can thus be arranged between the X-ray source 16 and the detector 18 in order to be able to acquire image information about the object. The table 22 may adjustable both in the height direction and in the longitudinal that is horizontal direction. Further, the gantry 20 may be provided having a rotating part onto which the X-ray source 16 and the detector 18 are mounted in order to rotate the source detection arrangement around the patient. Thus, image information can be acquired from different directions.

For example, the gantry 20 is part of a CT-system.

The imaging system 10 can also be provided as a C-arm system, where the X-ray source and the detector are mounted on opposite ends of a C-arm structure instead of being mounted to a rotary gantry as shown in FIG. 1. The imaging system 10 can also be provided with a non-movable X-ray source/detector arrangement.

According to FIG. 1, the image acquisition arrangement 12 is adapted to acquire the first and second 2D images. The image acquisition arrangement 12 is also adapted to acquire 3D volume data of the object, for example by the acquisition of a sequence of 2D images.

In case the imaging system is provided with a fixed X-ray source/detector arrangement, i.e. with an image acquisition arrangement primarily provided for acquiring 2D images in a single projection direction in relation to the object only, the 3D volume data to be registered with the 2D image acquired by the system is provided by further means, for example by a further imaging system or other modality.

The imaging device 14 comprises a processing unit 28, a display unit 30, and an alignment unit 32.

The processing unit 28 is adapted to receive image data provided by the image acquisition arrangement 12, which is indicated by a connecting line 34. The connection can be provided in form of a wire connection or in form of a wireless connection. Further, the display unit 30 is connected via a connection 36 to the processing unit 28. The alignment unit 32 is connected via a connection 38 with the processing unit 28. The alignment unit or the display unit can also be directly connected or connected via the image acquisition arrangement.

Figure 2:
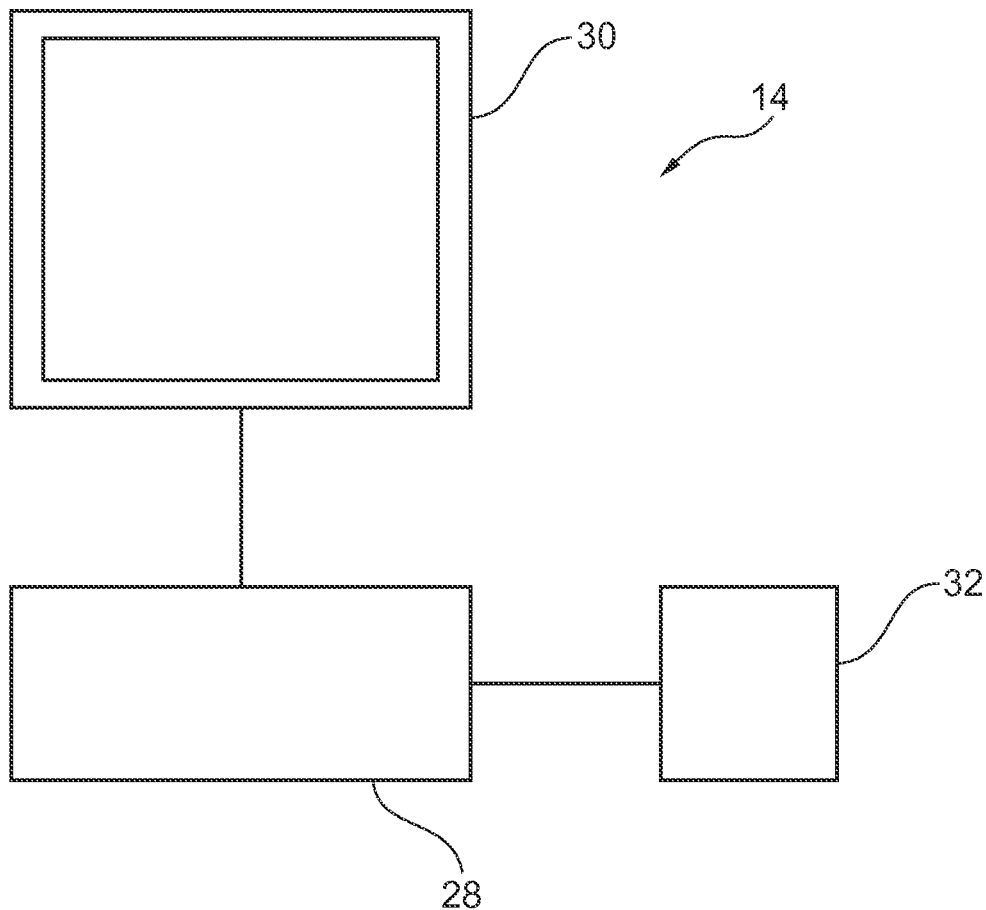
FIG. 2 illustrates an imaging device for registering 2D images with 3D volume data according to the invention.

FIG. 2 illustrates the imaging device for registering 2D images with 3D volume data according to the invention. The processing unit 28 is adapted to provide 3D volume data, comprising a frame of reference and to provide a first 2D image with a first image plane. The processing unit 28 is also adapted to blend the 2D image with a visualization of the 3D volume data and to define a transformation plane perpendicular to the first image plane. The processing unit is further adapted to provide a second 2D image with a second image plane and to project the transformation plane on the second 2D image with a second image plane. The processing unit 28 is further adapted to project at least one alignment interaction value on the transformation plane to determine at least one transformed interaction value and to translate the frame of reference with the at least one transformed interaction value. The alignment unit 32 is adapted to align the frame of reference with the first 2D image and to align the frame of reference with the second 2D image.

These aspects of the imaging device 14 will be described further in relation with the exemplary embodiments of a method for registering 2D images with the 3D volume data illustrated in the following figures.

According to an exemplary embodiment (not shown), a method is provided comprising the steps of: a) providing 3D volume data of an object, comprising a frame of reference; b) defining at least one transformation direction in relation to the 3D volume data; c) providing a 2D image of the object with an image plane; and projecting the at least one transformation direction on the image plane; d) aligning the frame of reference with the 2D image; wherein at least one alignment interaction value is projected on the at least one transformation direction to determine at least one transformed interaction value; and e) translating the frame of reference with the at least one transformed interaction value.

The at least one transformation direction may comprise an axis perpendicular to a first image, For example, a first mode is provided in which the translation in the second image is limited to the perpendicular axis of the first image.

For example, in the first mode one of the images is marked as primary image to which z-axis the interaction is limited.

Figure 3:
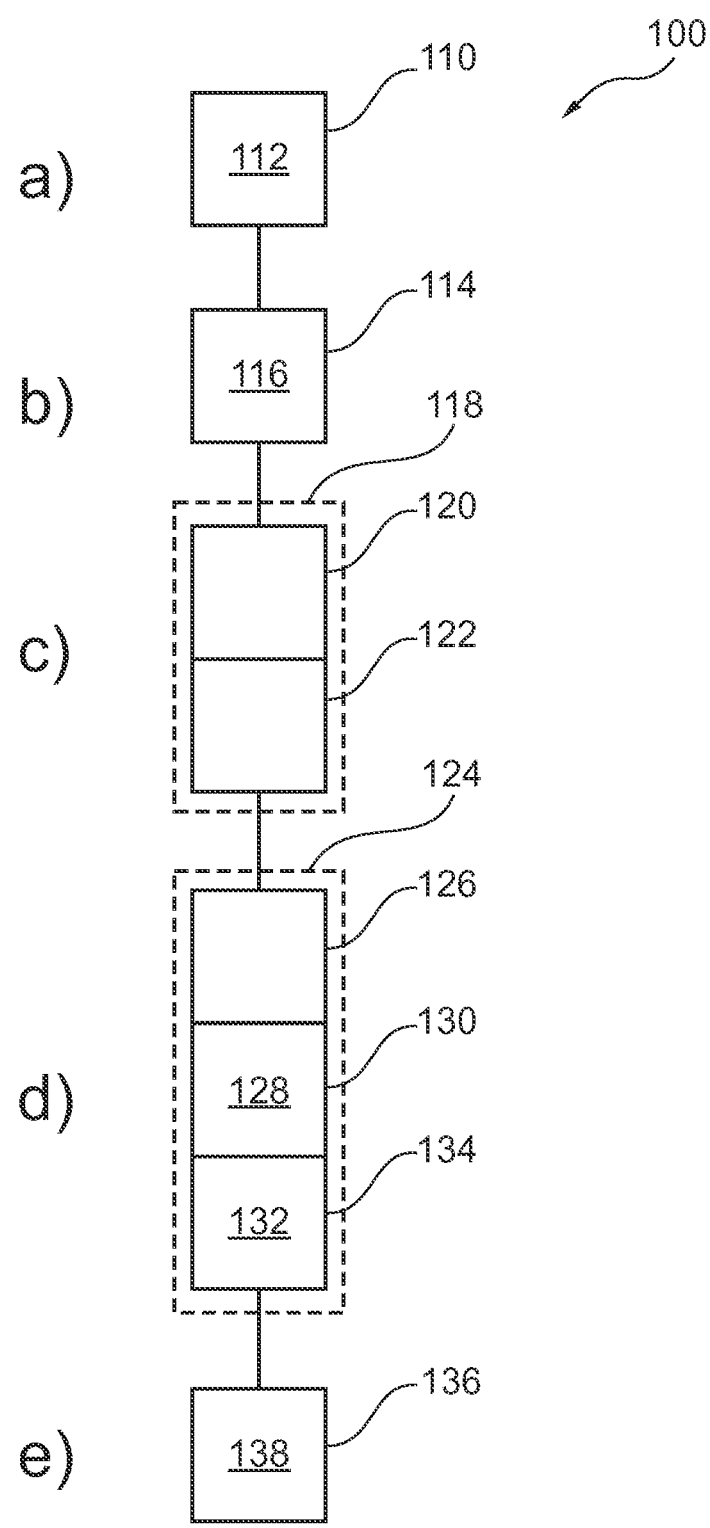
FIG. 3 illustrates basic method steps of a method for registering 2D images with 3D volume data according to an exemplary embodiment of the invention.

As a further exemplary embodiment, FIG. 3 shows a method 100 for registering 2D images with the 3D volume data comprising the following steps: In a first provision step 110, 3D volume data 112 of an object is provided, comprising a frame of reference. In a definition step 114, a transformation plane 116 is defined in relation to the 3D volume data 112. In a third step 118, a 2D image of the object with an image plane is provided in a provision sub-step 120. Further, the transformation plane 116 is projected on the image plane in a projection sub-step 122. Further, in a fourth step 124, the frame of reference is aligned with a 2D image in an alignment sub-step 126. Next, at least one alignment interaction value 128 is projected on the transformation plane in a projection sub-step 130. The projection 130 is provided to determine at least one transformed interaction value 132 in a determination sub-step 134. Next, the frame of reference is translated with the at least one transformed interaction value 132 in a translation step 136.

As a result, an aligned or registered image data 138 can be provided in which the 2D images are registered with the 3D volume data.

The transformation plane 116 may be provided perpendicular to the first image. For example, a second mode is provided in which the translation vector in the second image is projected on a plane perpendicular plane to the first image.

For example, in the second mode, where the interaction is limited to two axes, there is no need for marking one of the images since interaction is limited to the y/z plane of the other image.

The first provision step 110 is also referred to as step a), the definition step 114 as step b), the third step comprising the provision sub-step 120 and the projection sub-step 122 is also referred to as step c), the fourth step comprising the alignment sub-step 126, the projection sub-step 130, and the determination sub-step 134 is also referred to as step d), and the translation step 136 is also referred to as step e).

Figure 4:
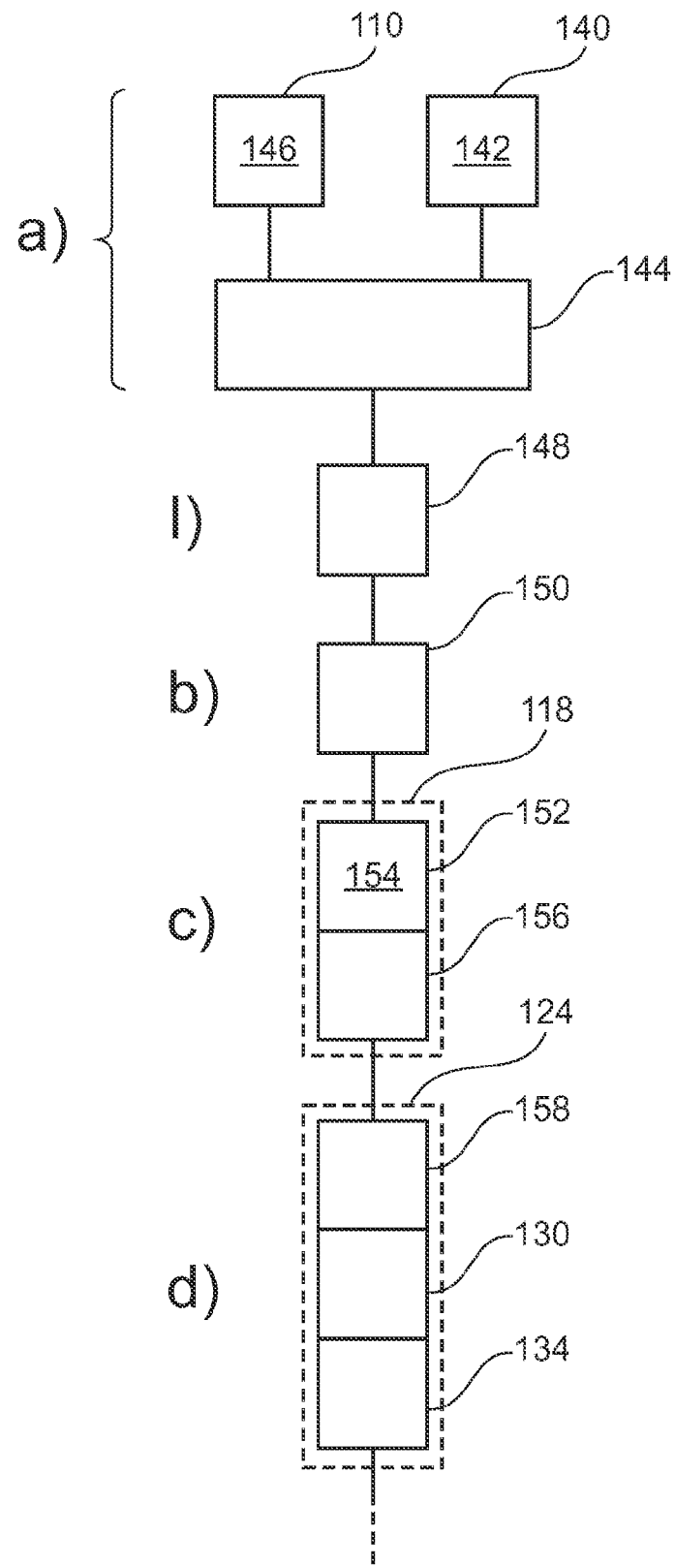
FIGS. 4 to 7 show further exemplary embodiments of methods according to the invention.

FIG. 4 illustrates a method in which step a) comprises a provision sub-step 140 in which a first 2D image 142 of the object with a first image plane in a first viewing direction is provided. Further, step a) also comprises a blending sub-step 144 in which the 2D image is blended with a visualization 146 of the 3D volume data.

Further, before step b) is performed, an alignment step 148 is provided in which the frame of reference is aligned with the first 2D image. The alignment step 148 is also referred to as step i).

It is further provided that step b) comprises a definition step 150 in which the transformation plane 116 is defined to be perpendicular to the first image plane.

Step c) comprises a provision sub-step 152 in which a second 2D image 154 of the object with a second image plane in a second viewing direction is provided. Further, step c) comprises a projection sub-step 156 in which the transformation plane 116 is projected on the second 2D image 154.

Step d) comprises an alignment sub-step 158 in which the frame of reference is aligned with the second 2D image. Further, step d) also comprises a projection sub-step 130 and a determination sub-step 134, as described with reference to FIG. 3. Of course, also the translation step 136 can be provided, which is not further shown.

For example, the aligning procedures, such as in the alignment sub-step 126, as well as in the alignment step 148, as well as the alignment sub-step 158 can be achieved by manual interaction of the user, for example via an interface device, such as a mouse or a track pad or joy stick.

The alignment interaction value may comprise the generation of at least one interaction delta.

The frame of reference can be attached to the volume data such that when the frame of reference is moved, also the volume data is moved, respectively.

Further, the first 2D image and the second 2D image can be acquired within the same frame of reference.

According to a further exemplary embodiment, not shown, in step i), the frame of reference is aligned by a spatial translation of the volume data within the first image plane. In step d) the frame of reference is aligned by a spatial translation of the volume data within the second image plane. In step e), the frame of reference is translated within the transformation plane.

For example, the alignment in step i) and the alignment in step d) comprise translating the frame of reference of the 3D volume data along the first and second plane, respectively.

The movement of the frame of reference of the alignment in step d) results in minimal and predictable changes in the first 2D image, i.e. a minimal displacement.

In step d) only movements of the frame of reference in the second image are allowed which correspond to a plane perpendicular to the image plane of a first image.

According to a further aspect, the first and the second image planes have an angle to each other of at least 10°, preferably at least 20°. In any case it is not necessary to provide a first and a second image which are acquired in exactly 90°. Of course, when acquiring such perpendicular views, the above described methods can also be applied. However, it is noted that the perpendicularity is not a requirement and can rather be omitted which facilitates the image acquisition steps on the side of the user.

In other words, the first and the second image plane can be arranged inclined to each other, i.e. they are not parallel to each other and they are also not perpendicular to each other.

For example, the first 2D image is provided in a plane comprising a first set of two axes which are arranged perpendicular to each other. The second 2D image is provided in a plane comprising a second set of two axes, which are arranged perpendicular to each other. One axis of the first set of two axes and one axis of the second set of two axes are aligned with each other.

For example, the aligned axes are approximately parallel to each other due to the geometry of the X-ray system with which the images are acquired.

Figure 5:
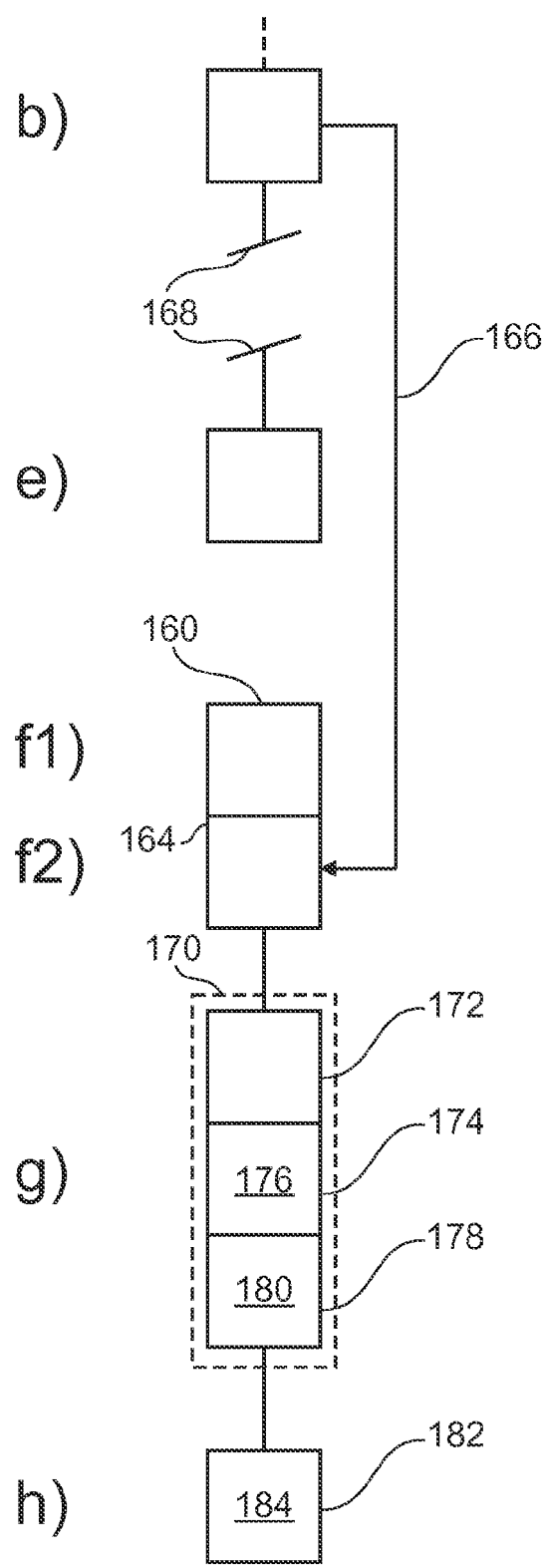

With reference to FIG. 5, some further steps are provided according to a further exemplary embodiment.

After performing one of the above described embodiments and aspects of a method, a further step f) is provided comprising a sub-step f1) with a provision step 160 in which a further 2D image 162 of the object with a further image plane in a further viewing direction is provided. In a sub-step f2), i.e. a projection sub-step 164, the transformation plane, for example the transformation plane 116, is projected on the further 2D image. The provision of the transformation plane is indicated with an arrow from step b) shown above, the arrow having the reference numeral 166. It is noted that step e) is schematically shown to indicate that one of the above described methods has already been performed. Two inclined lines 168 indicate that different embodiments can be performed between step b) and step e).

Following steps f1) and f2), a further step 170 is provided, also referred to as step g), comprising an alignment sub-step 172 in which the frame of reference is aligned with a further 2D image. In a projection sub-step 174, at least one further alignment interaction value 176 is projected on the transformation plane to perform a determination sub-step 178 in which at least one further transformed interaction value 180 is determined.

Following step g), a translation step 182 is provided, also referred to as step h), in which the frame of reference with the at least one further transformed interaction value 180 is translated. Thus, updated registered image information 184 is provided similar to the image content 138 as described in FIG. 3.

For example, if a further 2D image is provided, i.e. acquired, in a viewing direction that differs from the viewing direction of the 2D image in step a) by a predetermined threshold, steps f2) et seq. are triggered.

For example, steps f2) to h) are performed if the further viewing direction in step f1) differs from the viewing direction of the first 2D image in step a) by a predetermined threshold.

For example, 2D images are acquired during examination procedure for different purposes, for example for providing actual information of the situation present. In other words, although images are acquired which are not meant for registration purposes, it is possible to use these images for updating the registration information by performing this additional sequence of steps as described above.

For example, steps f2) to h) are performed in a predetermined interval, that in a preset timely repeated manner.

According to a further exemplary embodiment, not shown, in step a) the 3D volume data is provided in a first projection corresponding to the first viewing direction, and in step d) the 3D volume data is provided in a second projection corresponding to the second viewing direction.

For example, the 2D images can be provided as current images and the 3D volume data is provided as a per-operative or pre-scan 3D volume data.

For example, the 3D volume data is reconstructed from pre-acquired 2D image data.

According to a further aspect, in step i) and step d), the alignment is achieved by an interaction device, as mentioned above. The alignment interaction comprises at least one interaction vector generated by the interaction device.

Figure 6:
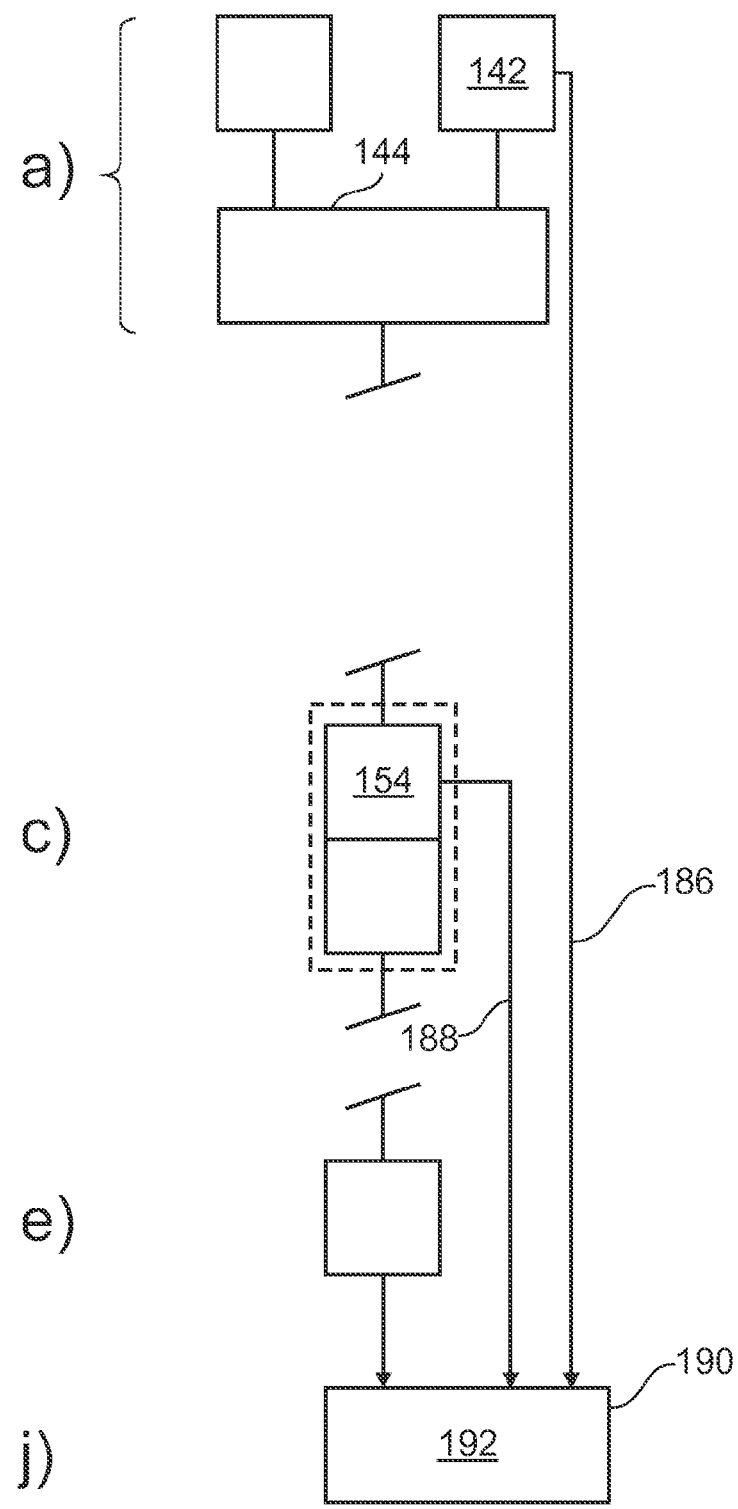

FIG. 6 shows a further exemplary embodiment of a method according to the invention, in which the first 2D image 142 and/or the second 2D image 154 are provided, which is indicated by a first arrow 186 and a second arrow 188, and combined in a combination step 190, also referred to as step g) with the translated 3D volume data provided by step e).

For example, the first and/or second 2D image is overlaid to the 3D volume data.

Thus, in step g) combined registered image information 192 may be provided, which for example can be presented to the user.

Figure 7:
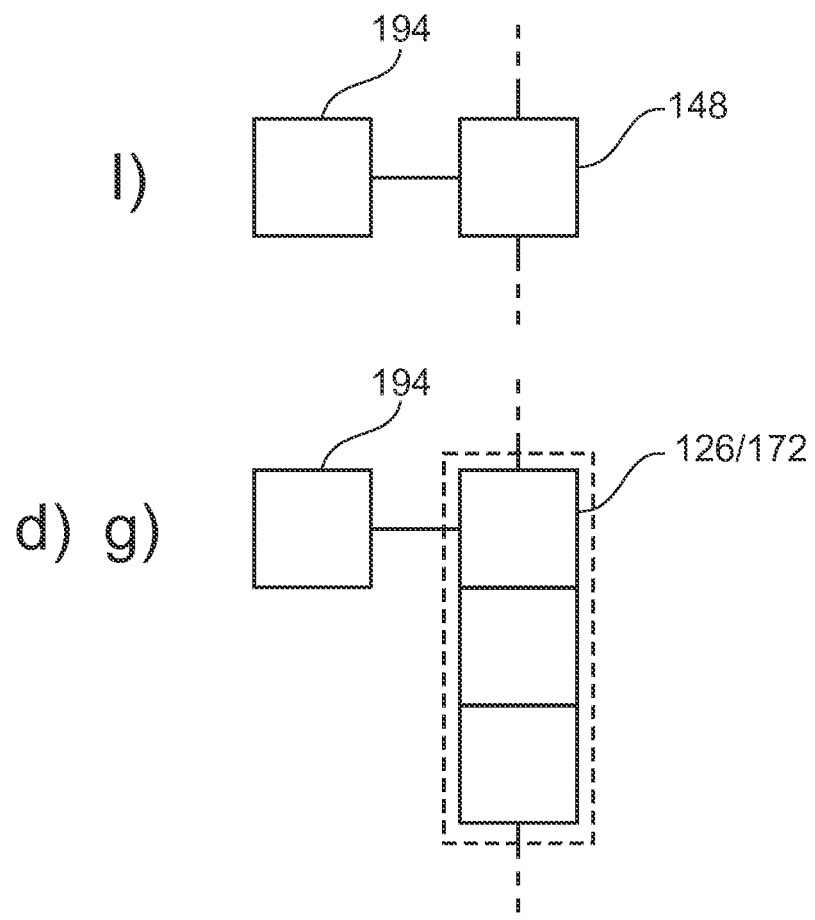

As shown in FIG. 7, the alignment in step i) and/or the alignment in step d) are provided manually by the user. This is indicated in the upper part of FIG. 7 with a manual interaction frame 194 connected to the alignment 148. In the lower part of FIG. 7, the manual interaction frame 194 is connected to the alignment sub-step 126/172, concerning the steps d) and g), respectively.

As an alternative, not shown, the alignment is provided automatically.

Of course, also semi-automatic, i.e. a combination of manual and automatic alignment can be provided.

Before referring to FIGS. 8 and 9, in the following some further aspects of the invention shall be discussed.

According to an aspect of the invention, two X-ray angiograms may be used in the same frame of reference, i.e. in the same X-ray modality frame of reference. Thereby, a different way of interaction is defined in such a way that moving the frame of reference in one image will result in minimal and predictable changes in the other image. Thus, the user can register a 2D and 3D frame of reference in two images without the need to iteratively correct either views.

A central aspect of the invention is that when manipulating the frame of reference of the 3D data in the (manipulating) view 1, the movements in the other (reference) view 2 are as minimal and predictable as possible. Vice versa, when manipulating in view 2, the movements in the (reference) view 1 are minimized. This is achieved by only allowing movements in a manipulating view that corresponds to the Y- and Z-axis of the other reference view, i.e. up and down and forward and backward. The up and down axis of both images are always approximately in parallel due to the geometry of the X-ray system.

Assuming two images, image A is the reference image for which the apparent movements should be limited, and image B is the image to interact upon to move the frame of reference, an orthogonal (Y/Z) plane to the reference image is created.

This orthogonal plane is used to project interaction deltas thereon, i.e. the vector derived from moving the mouse from position A to position B is transformed in a vector on the (possibly) oblique plane to define the actual vector to translate the frame of reference with.

Because the projective vector is still in line with the vector derived from the mouse movement, the frame of reference appears to move following the mouse movement, however in reality it can move in three dimensions. And because the projected vector is on a plane in line with Y/Z-axis of the reference image, the frame of reference in view 1 appears only to move up and down (and forward and backward, but this effect is less obvious).

After correcting the frame of reference to make it aligned in view 1, the frame of reference then only needs to be aligned following the X-axis of the reference view. By using the same approach for registering view 2, moving the frame of reference along the X-axis will only affect the movement along the Z-axis in the view 1 (now the reference view). So, in almost all cases, the user can correctly register the frames of reference in three translations, namely two in one view and one in the other view.

Of course, the mouse driven interaction can also be applied to press and hold type interaction by repeatedly projecting deltas in the plane of the registration to the orthogonal plane of the reference image.

Figure 8A:
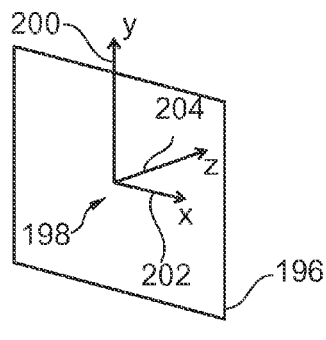
FIGS. 8a) to 8d) show further aspects of registering 2D and 3D image data according to an exemplary embodiment of the invention.

In FIG. 8a), an image A is indicated with an image frame 196. Further, a space axis system 198 is shown with a first axis 200 arranged in an upright manner, i.e. pointing in the vertical direction upwards. Further, a second axis 202 is shown being arranged within the plane of the image A. Further, a third axis 204 is shown which is perpendicular to the plane of the image A. In other words, all three axes 200, 202, 204 are arranged perpendicular to each other, wherein the first and the second axes 200, 202 define the plane of the image A. The first axis is also referred to as the Y-axis, the second axis 202 as the X-axis, and the third axis 204 as the Z-axis. In the following, the three axes are referred to with their letters x, y, z instead of their reference numbers 200, 202, 204.

Figure 8B:
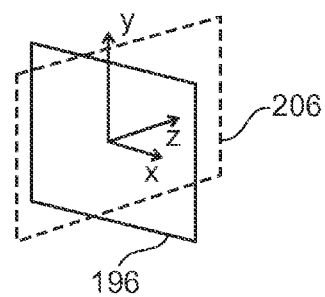

As shown in FIG. 8b), a plane 206 is created from the Y- and Z-axis to provide the plane 206 to be perpendicular to the plane of the image 196.

Figure 8C:
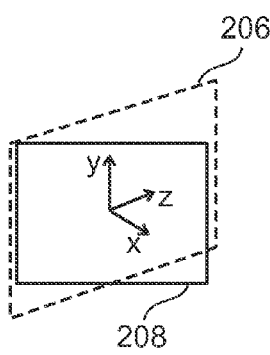

In FIG. 8c), a second image B, indicated with an image frame 208 is provided.

For example, the first image A 196 and the second image B 208 are provided as angiograms.

The perpendicular plane 206 is also shown, with the dotted line frame as in FIG. 8b).

The first image 296 in FIG. 8a) is shown in combination with a 3D volume representation, wherein the 3D volume representation is provided in the same viewing direction as the image 196.

With reference to FIG. 8c), the 3D volume data is also shown with a representation in a corresponding viewing direction, although the 3D volume data representation is not illustrated in FIGS. 8a) to 8d). The perpendicular plane 206 is projected on the second image 208.

Figure 8D:
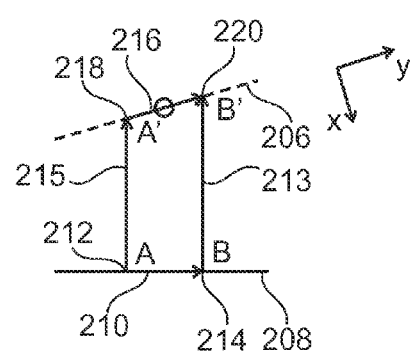

FIG. 8d) illustrates the basic principle of the alignment procedure. The image B, i.e. the second image 208, and the reference plane 206 are shown, so-to-speak, in a view from above, which is why the two planes are only indicated with a respective line instead of a frame. Thus, the coordinate system, or spatial axes are only shown for the Z-axis and the X-axis. In FIG. 8d), the Y-axis would be perpendicular to the plane of the figure sheet.

The alignment being applied to the second image 208 is generating interaction values or interaction deltas, for example indicated with a first arrow 210, leading from point A to point, B for moving the respective frame of reference of the 3D volume representation from position A, indicated with reference numeral 212, to the position B, indicated also with reference numeral 214. According to the invention, the interaction deltas in the second image are projected on the reference plane 206 resulting in so-to-speak transformed interaction vectors, indicated with a second arrow 216 for moving the frame of reference from the projected position A' to the projected position B', wherein the projected position A' is also indicated with reference numeral 218, and position B' with reference numeral 220. The projection is indicated with two arrows 213, 215.

Instead of moving or translating the frame of reference, i.e. the 3D volume data, in relation to the second image with the interaction vector 210, the volume frame of reference is translated by the projected vector 216.

Thus, the volume is translated within the plane 206 perpendicular to the first image 196, i.e. translated in the Z- or Y-direction.

Figure 9:
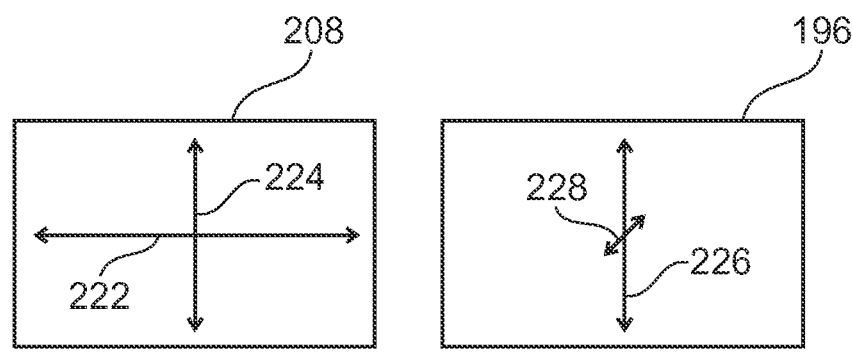
FIG. 9 shows a further aspect of registering 2D/3D image data according to an exemplary embodiment of the invention.

As shown in FIG. 9, the alignment of the second image 208 is a movement of the 3D volume in relation to the second image when seen from front in a left/right part 222 and upward/downward part 224. At the same time, the 3D volume data is moved in the viewing direction of the first image 196, i.e. in relation to the first image 196 only in a vertical direction, i.e. upward and downward, and indicated with a further vertical arrow 226. The forward and backward movement is indicated with a smaller arrow 228. In other words, the movement along the arrow direction 224 leads to a movement along the arrow direction 226 in the first image, wherein the movement along the horizontal direction 222 leads to the movement along the depth, i.e. the backward and forward direction 228.

In the case of the first mode mentioned above, where the translation in the second image 142/208 is limited to the perpendicular axis of the first image, instead of the dotted frame representing the plane 206, in FIG. 8b) a projection axis in z-direction as transformation direction is provided. This direction or axis is then projected on the image plane of the second image in FIG. 8c). The alignment in FIG. 8d) is then performed while the translation in the second image is restricted or limited to the transformation axis or transformation direction.

For example, the present invention is useful for structural heart disease procedures, in which devices are implanted in the heart with a catheter-based technique. During the implantation, the device is positioned using X-ray imaging. In order for a correct alignment and positioning of the device with respect to the tissue, an X-ray view is needed that has registered the frame of reference of a segmented CT volume. For supporting planning and guidance of the structural heart disease procedures, planning and guidance tool allows for registration of a 3D CT data set to X-ray and allows live overlay of X-ray on CT. Thus, the user is able to perform the registration of the X-ray to the CT volume in a very fast and intuitive way. In particular, the registration is applicable during an intervention.

As a fallback scenario, when only one angiogram may be acquired, or when the angle between the Y/Z-plane and view 1 is very steep, it is possible to fall back to moving the frame of reference in the plane of the angiogram, i.e. dragging the mouse to the left in image, will also move the frame of reference to the left in 3D.

In another exemplary embodiment of the present invention (not shown), a computer program or a computer program element is provided i.e. characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention (not shown), a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage.

The invention claimed is:

1. A method for registering 2D images with 3D volume data, comprising, with a processor:
   receiving 3D volume data of an object, comprising a frame of reference;
   receiving a first 2D image of the object with a first image plane in a first viewing direction;
   blending the 2D image with a visualization of a projection of the 3D volume data in the first viewing direction;
   spatially translating the 3D volume data in the first image plane to align the frame of reference with the first 2D image;
   defining a first and a second transformation direction in relation to the 3D volume data and defining a transformation plane perpendicular to the first image plane;
   providing a second 2D image of the object with a second image plane in a second viewing direction;
   projecting the transformation plane on the second 2D image;
   spatially translating the 3D volume data within the second image plane to align the frame of reference with the second 2D image;
   projecting at least one alignment interaction value on the transformation plane to determine at least one transformed interaction value;
   translating the frame of reference within the transformation plane with the at least one transformed interaction value;
   projecting the 3D volume data in the second viewing direction; and
   combining the second 2D image with the projected 3D image data.

2. The method according to claim 1, wherein the following steps are provided:
   providing a further 2D image of the object with a further image plane in a further viewing direction; and
   projecting the transformation plane on the further 2D image;
   aligning the frame of reference with the further 2D image;
   wherein at least one further alignment interaction value is projected on the transformation plane to determine at least one further transformed interaction value; and
   translating the frame of reference with the at least one further transformed interaction value.

3. The method according to claim 1, wherein the 2D images are provided as current images: and wherein the 3D volume data is provided as a pre-operative 3D volume data;
   wherein the 3D volume data is provided as CT volume data; and wherein the first and second 2D images are provided as X-ray fluoroscopy images.

4. The method according to claim 1, further including:
   with a display device, displaying the combined 2D images and the projections of the 3D volume data.

5. The method according to claim 1, further including:
   with one or more diagnostic imaging systems, generating the 3D volume data and a plurality of 2D images.

6. An imaging device for registering 2D images with 3D volume data, comprising:
   one or more processors configured to:
      receive 3D volume data of an object, comprising a frame of reference,
      receive a first 2D image of the object with a first image plane in a first viewing direction,
      blend the 2D image with a visualization of a projection of the 3D volume data in the first viewing direction,
      spatially translate the 3D volume data in the first image plane to align the frame of reference with the first 2D image,
      define a first and a second transformation direction in relation to the 3D volume data and defining a transformation plane perpendicular to the first image plane,
      provide a second 2D image of the object with a second image plane in a second viewing direction,
      project the transformation plane on the second 2D image,
      spatially translate the 3D volume data within the second image plane to align the frame of reference with the second 2D image,
      project at least one alignment interaction value on the transformation plane to determine at least one transformed interaction value,
      translate the frame of reference within the transformation plane with the at least one transformed interaction value,
      project the 3D volume data in the second viewing direction,
      combine the second 2D image with the projected 3D image data; and
   a display device configured to display the combined 2D images and the projections of the 3D volume data.

7. The imaging device according to claim 6, further including:
   an interface configured to provide the one or more processors with a user input.

8. The imaging device for registering 2D and 3D image data according to claim 6 further including:
   one or more diagnostic scanners configured to acquire the data for the first 2D image and the second 2D image.

9. A non-transitory computer-readable medium carrying software for controlling one or more processors to perform the method according to claim 1.

10. An imaging device for registering at least first and second 2D images which have at least one axis of their coordinate systems parallel to each other with 3D volume data, comprising:
   one or more processors configured to:
      define a transform plane perpendicular to an image plane of the first 2D image,
      receive a translation vector which brings the second 2D image into registration with the 3D volume data,
      project the translation vector onto the transformation plane to obtain a transformed translation vector,
      translate the frame of reference of the 3D volume data using the transformed translation vector,
      combine the second 2D image with the translated 3D volume data, and
   a display device configured to display the combined 2D image and the translated 3D volume data.

\* \* \* \* \*